(12) United States Patent
Motoyoshi

(10) Patent No.: US 11,485,012 B2
(45) Date of Patent: Nov. 1, 2022

(54) CONTROL METHOD AND ROBOT SYSTEM

(71) Applicant: Seiko Epson Corporation, Tokyo (JP)

(72) Inventor: Masaki Motoyoshi, Azumino (JP)

(73) Assignee: SEIKO EPSON CORPORATION

( * ) Notice: Subject to any disclaimer, the term of this patent is extended or adjusted under 35 U.S.C. 154(b) by 138 days.

(21) Appl. No.: 17/118,759

(22) Filed: Dec. 11, 2020

(65) Prior Publication Data

US 2021/0178580 A1 Jun. 17, 2021

(30) Foreign Application Priority Data

Dec. 12, 2019 (JP) .............................. JP2019-224347

(51) Int. Cl.
*B25J 9/16* (2006.01)
*B25J 9/04* (2006.01)
*B25J 13/08* (2006.01)
*B25J 19/00* (2006.01)

(52) U.S. Cl.
CPC ............. *B25J 9/1633* (2013.01); *B25J 9/044* (2013.01); *B25J 13/085* (2013.01); *B25J 13/088* (2013.01); *B25J 19/0004* (2013.01)

(58) Field of Classification Search
CPC ........ B25J 9/1633; B25J 9/044; B25J 13/085; B25J 13/088; B25J 19/0004; B25J 9/1674; B25J 9/1602; G05B 2219/40218
USPC ................. 700/245–264; 318/568.11–568.25
See application file for complete search history.

(56) References Cited

U.S. PATENT DOCUMENTS

| | | | | |
|---|---|---|---|---|
| 4,801,856 A | * | 1/1989 | Wajima | G05B 19/416 318/568.22 |
| 4,955,654 A | * | 9/1990 | Tsuchihashi | B64G 4/00 901/34 |
| 4,998,206 A | * | 3/1991 | Jones | G05B 19/41835 700/145 |
| 5,363,474 A | * | 11/1994 | Sarugaku | G05B 19/425 700/256 |
| 5,581,666 A | * | 12/1996 | Anderson | B25J 9/161 700/263 |
| 6,678,582 B2 | * | 1/2004 | Waled | B25J 9/1676 700/262 |
| 7,166,977 B2 | * | 1/2007 | Takayama | B25J 19/06 318/568.11 |

(Continued)

FOREIGN PATENT DOCUMENTS

JP S62-140795 A 6/1987
JP H09-254079 A 9/1997

*Primary Examiner* — Jaime Figueroa
(74) *Attorney, Agent, or Firm* — Harness, Dickey & Pierce, P.L.C.

(57) ABSTRACT

A control method executes a first step of actuating a brake to decelerate a robot arm, a second step of releasing or relaxing the actuation of the brake when one of Conditions A1, A2, and A3 is satisfied after deceleration of the robot arm, and a third step of actuating the brake again to restrict driving of the robot arm when one of Conditions B1, B2, and B3 is satisfied after release or relaxation of the brake, Condition A1: a velocity of the robot arm becomes a predetermined value or less; Condition A2: a contact state between the robot arm and the object becomes stable; Condition A3: time TA elapses; Condition B1: time TB elapses; Condition B2: a movement amount of the robot arm becomes a predetermined value or more; and Condition B3: the contact state between the object and the robot arm is released or relaxed.

9 Claims, 5 Drawing Sheets

(56) References Cited

U.S. PATENT DOCUMENTS

| | | | |
|---|---|---|---|
| 8,185,243 B2* | 5/2012 | Okazaki | B25J 9/1075 901/29 |
| 8,491,603 B2* | 7/2013 | Yeung | A61B 34/77 901/14 |
| 8,600,552 B2* | 12/2013 | Nakajima | B25J 9/1697 700/258 |
| 8,751,040 B2* | 6/2014 | Wells | B25J 19/0004 700/245 |
| 9,080,918 B2* | 7/2015 | Fishel | G01L 1/02 |
| 10,022,196 B2* | 7/2018 | Griffiths | B25J 9/02 |
| 10,661,443 B2* | 5/2020 | Osaka | B25J 13/088 |
| 10,746,235 B2* | 8/2020 | Denninger | B25J 19/00 |
| 11,197,731 B2* | 12/2021 | Hoffman | A61B 18/12 |
| 2003/0225479 A1* | 12/2003 | Waled | B25J 9/1676 700/245 |
| 2006/0192515 A1* | 8/2006 | Takayama | B25J 19/0004 318/568.21 |
| 2007/0299427 A1* | 12/2007 | Yeung | A61B 34/77 606/1 |
| 2008/0033240 A1* | 2/2008 | Hoffman | G06F 3/04845 600/109 |
| 2009/0048713 A1* | 2/2009 | Glissmann | B23Q 5/58 700/258 |
| 2011/0106311 A1* | 5/2011 | Nakajima | B25J 9/163 700/253 |
| 2011/0218676 A1* | 9/2011 | Okazaki | B25J 9/1075 901/29 |
| 2011/0245970 A1* | 10/2011 | Wells | B25J 19/0095 700/245 |
| 2014/0025204 A1* | 1/2014 | Schlaich | B25J 19/06 700/255 |
| 2017/0079731 A1* | 3/2017 | Griffiths | A61B 34/37 |
| 2019/0128340 A1* | 5/2019 | Denninger | B25J 13/088 |
| 2020/0405403 A1* | 12/2020 | Shelton, IV | A61B 17/3417 |
| 2021/0237271 A1* | 8/2021 | Liu | H03K 17/955 |
| 2021/0402591 A1* | 12/2021 | Klassen | B25J 19/0029 |

* cited by examiner

CONTROL METHOD AND ROBOT SYSTEM

The present application is based on, and claims priority from JP Application Serial Number 2019-224347, filed Dec. 12, 2019, the disclosure of which is hereby incorporated by reference herein in its entirety.

BACKGROUND

1. Technical Field

The present disclosure relates to a control method and a robot system.

2. Related Art

Recently, in factories, due to labor cost rise and labor shortage, work manually performed in the past has been increasingly automated by various robots and robot peripherals. As the various robots, e.g. an industrial robot as shown in JP-A-62-140795 is known.

The industrial robot in JP-A-62-140795 has a contact sensing device that senses contact with an object. When the contact sensing device senses contact with an object, the motor of the arm of the industrial robot is stopped and the brake is actuated to stop the motion of the arm. Then, the brake is released. Thereby, excessive load applied to the object after the contact may be prevented or suppressed.

However, in the industrial robot of JP-A-62-140795, the arm becomes free after release of the brake, and thus, the arm may unintentionally move before the work is restarted. Accordingly, safety is not sufficiently secured.

SUMMARY

The present disclosure has been achieved to solve at least a part of the above described problem and can be realized as below.

A control method of an application example is a control method for a robot having a robot arm, a drive unit that drives the robot arm, and a brake that decelerates the robot arm, including a first step of actuating the brake to decelerate the robot arm when contact of an object with the robot arm during driving is determined, a second step of releasing or relaxing the actuation of the brake when one of the following condition A1, the following condition A2, and the following condition A3 is satisfied after the first step, and a third step of actuating the brake again to restrict driving of the robot arm when one of the following condition B1, the following condition B2, and the following condition B3 is satisfied after the second step:

condition A1: after deceleration of the robot arm, a velocity of the robot arm becomes equal to or less than a predetermined value;

condition A2: after deceleration of the robot arm, a contact state between the robot arm and the object becomes stable;

condition A3: after deceleration of the robot arm, time TA elapses;

condition B1: after release or relaxation of the brake, time TB elapses;

condition B2: after release or relaxation of the brake, a movement amount of the robot arm becomes equal to or more than a predetermined value; and condition B3: after release or relaxation of the brake, the contact state between the object and the robot arm is released or relaxed.

A robot system of an application example includes a robot arm, a drive unit that drives the robot arm, a brake that decelerates the robot arm, and a control unit that controls actuation of the drive unit and the brake, wherein the control unit actuates the brake to decelerate the robot arm when determining that an object contacts the robot arm during driving, releases or relaxes the actuation of the brake when one of the following condition A1, the following condition A2, and the following condition A3 is satisfied after deceleration of the robot arm, and actuates the brake again to restrict driving of the robot arm when one of the following condition B1, the following condition B2, and the following condition B3 is satisfied after release or relaxation of the brake:

condition A1: after deceleration of the robot arm, a velocity of the robot arm becomes equal to or less than a predetermined value;

condition A2: after deceleration of the robot arm, a contact state between the robot arm and the object becomes stable;

condition A3: after deceleration of the robot arm, time TA elapses;

condition B1: after release or relaxation of the brake, time TB elapses;

condition B2: after release or relaxation of the brake, a movement amount of the robot arm becomes equal to or more than a predetermined value; and condition B3: after release or relaxation of the brake, the contact state between the object and the robot arm is released or relaxed.

DESCRIPTION OF EXEMPLARY EMBODIMENTS

As below, a control method and a robot system according to the present disclosure will be explained in detail based on preferred embodiments shown in the accompanying drawings.

First Embodiment

Figure 1:
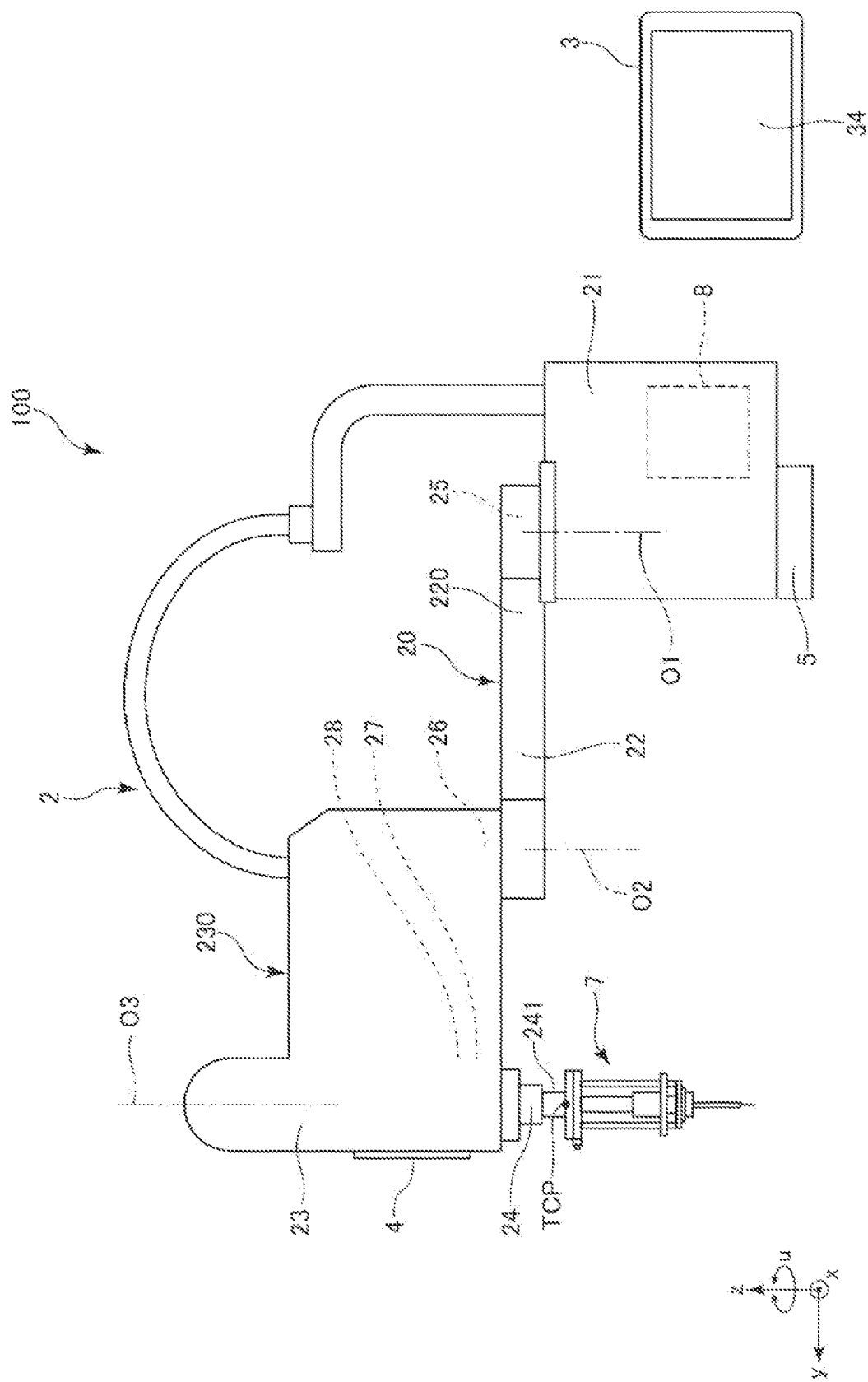
FIG. 1 is a schematic configuration diagram of a robot system according to the present disclosure.
Figure 2:
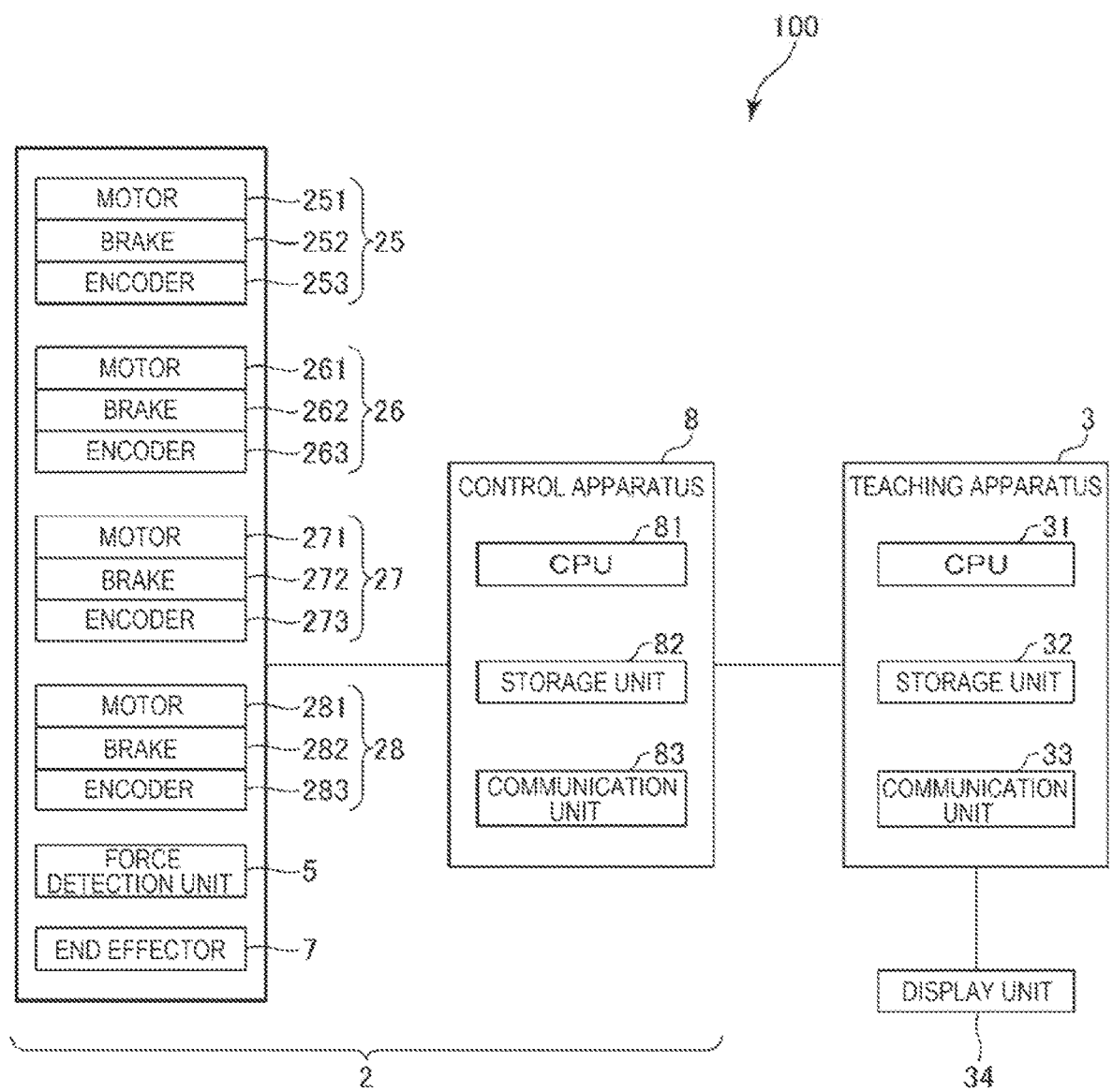
FIG. 2 is a block diagram of the robot system shown in FIG. 1.

FIG. 1 is a schematic configuration diagram of a robot system according to the present disclosure. FIG. 2 is a block diagram of the robot system shown in FIG. 1. FIGS. 3 to 6 are side views of a third arm provided in a robot shown in FIG. 1. FIG. 7 is a flowchart for explanation of a control method according to the present disclosure.

In FIG. 1, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions".

Further, hereinafter, for convenience of explanation, the +z-axis direction, i.e., the upside in FIG. 1 is also referred to as "upper" or "above" and the −z-axis direction, i.e., the downside is also referred to as "lower" or "below". Furthermore, with respect to a robot arm 20, a base 21 side in FIG. 1 is referred to as "proximal end" and the opposite side, i.e., an end effector 7 side is referred to as "distal end". The z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIGS. 1 and 2 is used for work of e.g. holding, transport, assembly, inspection, etc. of workpieces including electronic components and electronic apparatuses. The robot system 100 includes a robot 2, and a teaching apparatus 3 that teaches a motion program to the robot 2. Further, the robot 2 and the teaching apparatus 3 are communicably coupled via wired connection or wireless connection and the communication may be made via a network such as the Internet.

First, the robot 2 is explained.

The robot 2 is a horizontal articulated robot, i.e., a scalar robot in the illustrated configuration. As shown in FIG. 1, the robot 2 includes a base 21, the robot arm 20 coupled to the base 21, a receiving unit 4 that receives a predetermined operation from an operator, a force detection unit 5, an end effector 7, and a control apparatus 8 that controls actuation of these respective units.

The base 21 is a part supporting the robot arm 20. In the base 21, the control apparatus 8, which will be described later, is provided. Further, in an arbitrary portion of the base 21, the origin of the robot coordinate system is set. Note that the x-axis, the y-axis, and the z-axis shown in FIG. 1 are the axes of the robot coordinate system.

The robot arm 20 includes a first arm 22, a second arm 23, and a third arm 24 as a working head. The coupling portion of the base 21 and the first arm 22, the coupling portion of the first arm 22 and the second arm 23, and the coupling portion of the second arm 23 and the third arm 24 are also referred to as "joints".

Note that the robot 2 is not limited to the illustrated configuration, but the number of arms may be one, two, four, or more.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, and a z-drive unit 28 that moves the shaft 241 in the z-axis directions relative to the second arm 23.

As shown in FIGS. 1 and 2, the drive unit 25 is provided inside of a housing 220 of the first arm 22 and has a motor 251 that generates a drive force, a brake 252, a reducer (not shown) that reduces the drive force of the motor 251, and an encoder 253 that detects the rotation angle of the rotation shaft of the motor 251 or the reducer.

The drive unit 26 is provided inside of a housing 230 of the second arm 23 and has a motor 261 that generates a drive force, a brake 262, a reducer (not shown) that reduces the drive force of the motor 261, and an encoder 263 that detects the rotation angle of the rotation shaft of the motor 261 or the reducer.

The u-drive unit 27 is provided inside of the housing 230 of the second arm 23 and has a motor 271 that generates a drive force, a brake 272, a reducer (not shown) that reduces the drive force of the motor 271, and an encoder 273 that detects the rotation angle of the rotation shaft of the motor 271 or the reducer.

The z-drive unit 28 is provided inside of the housing 230 of the second arm 23 and has a motor 281 that generates a drive force, a brake 282, a reducer (not shown) that reduces the drive force of the motor 281, and an encoder 283 that detects the rotation angle of the rotation shaft of the motor 281 or the reducer.

As the motor 251, the motor 261, the motor 271, and the motor 281, e.g. servo motors such as AC servo motors or DC servo motors may be used. Further, as the reducers, e.g. planet gear reducers, wave gearings, or the like may be used.

The brake 252, the brake 262, the brake 272, and the brake 282 have functions of decelerating the robot arm 20. Specifically, the brake 252 reduces the motion velocity of the first arm 22, the brake 262 reduces the motion velocity of the second arm 23, the brake 272 reduces the motion velocity of the third arm 24 in the u-directions, and the brake 272 reduces the motion velocity of the third arm 24 in the z-axis directions.

The control apparatus 8 is actuated when the energization condition is changed to decelerate the respective parts of the robot arm 20. The brake 252, the brake 262, the brake 272, and the brake 282 are controlled independently of the motor 251, the motor 261, the motor 271, and the motor 281 by the control apparatus 8. That is, ON, OFF of energization of the motor 251, the motor 261, the motor 271, and the motor 281 and ON, OFF of energization of the brake 252, the brake 262, the brake 272, and the brake 282 are not interlocked.

The brake 252, the brake 262, the brake 272, and the brake 282 include electromagnetic brakes, mechanical brakes, hydraulic brakes, and pneumatic brakes. As below, the brake 252, the brake 262, the brake 272, and the brake 282 will be explained as electromagnetic brakes. Note that the electromagnetic brakes include excitation-operated brakes that decelerate the robot arm 20 by energization and non-excitation-operated brakes that decelerate the robot arm 20 by shut off of energization, and excitation-operated brakes that decelerate the robot arm 20 by energization will be explained as below.

As shown in FIG. 2, the encoder 253, the encoder 263, the encoder 273, and the encoder 283 are position detectors that detect the position of the robot arm 20. The encoder 253, the encoder 263, the encoder 273, and the encoder 283 are respectively electrically coupled to the control apparatus 8. The encoder 253, the encoder 263, the encoder 273, and the encoder 283 transmit information on the detected rotation angles as electrical signals to the control apparatus 8. Thereby, the control apparatus 8 may control actuation of the robot arm 20 based on the received information on the rotation angles. Further, the control apparatus 8 may calculate movement amounts in Condition B2, which will be described later, based on detection results of the encoder 253, the encoder 263, the encoder 273, and the encoder 283.

The drive unit 25, the drive unit 26, the u-drive unit 27, and the z-drive unit 28 are respectively coupled to corresponding motor drivers (not shown) and controlled by the control apparatus 8 via the motor drivers.

The base 21 is fixed to e.g. a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane about the first axis O1 relative to the base 21. The encoder 253 is configured to detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 drives, the second arm 23 rotates within a horizontal plane about the second axis O2 relative to the first arm 22. The encoder 263 is configured to detect the amount of driving, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is the arm at the most distal end of the robot arm 20.

When the u-drive unit 27 that rotates the shaft 241 drives, the shaft 241 rotates about the z-axis. Further, the encoder 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., the z-axis directions. Further, the encoder 283 is configured to detect the amount of movement of the shaft 241 in the z-axis directions relative to the second arm 23.

In the robot 2, with the distal end of the shaft 241 as a control point TCP, a distal end coordinate system having the origin at the control point TCP is set. The distal end coordinate system and the above described robot coordinate system were calibrated and a position in the distal end coordinate system may be transformed into that in the robot coordinate system. Thereby, the position of the control point TCP may be located in the robot coordinate system.

Further, various end effectors are detachably coupled to the lower end portion of the shaft 241. The end effector is not particularly limited to, but includes e.g. one that grips an object to be transported, one that processes an object to be processed, and one used for inspection. In the embodiment, the end effector 7 is detachably coupled.

The end effector 7 is not a component element of the robot 2 in the embodiment, however, a part or entire of the end effector 7 may be a component element of the robot 2.

As shown in FIG. 1, the force detection unit 5 detects a force applied to the robot 2, i.e., a force applied to the robot arm 20 and the base 21. In the embodiment, the force detection unit 5 is provided at the downside, i.e., at the −z-axis side of the base 21 and supports the base 21 from the downside.

The position where the force detection unit 5 is placed is not limited to that described above, but may be the lower end portion of the shaft 241 or the respective joint portions.

The force detection unit 5 may include e.g. a plurality of elements formed using a piezoelectric material such as quartz crystal and outputting electric charge when subjected to an external force. The control apparatus 8 may perform conversion into an external force applied to the robot arm 20 according to the amounts of electric charge. Further, such a piezoelectric material can adjust the direction to generate the electric charge when subjected to the external force according to the direction in which the material is placed.

As described above, the robot 2 has the force detection unit 5 that detects the force applied to the robot arm 20. Thereby, the force applied to the robot arm 20 may be detected.

In the embodiment, the force detection unit 5 functions as a contact sensing unit that senses contact of the robot arm 20 with another object. That is, as will be described later, whether or not an object contacts the robot arm 20 during driving of the robot arm 20 is determined based on the detection result of the force detection unit 5.

Note that the contact sensing unit is not limited to that, but e.g. a capacitive contact sensor, optical sensor, camera, or the like may be used. That is, whether or not an object contacts the robot arm 20 during driving of the robot arm 20 may be determined based on the detection results of the sensors.

Particularly, when a camera is used as the contact sensing unit, a velocity or the like may be estimated from a plurality of chronologically captured images, not only sensing of the contact from the captured images. Accordingly, the camera may be used not only for a determination at step S102 but also for determinations at steps S104 and S106, which will be described later. Therefore, the configuration of the robot system 100 may be simplified.

The receiving unit 4 is a part that receives the predetermined operation by the operator. The receiving unit 4 has a teaching button (not shown). The teaching button may be used when direct teaching is performed. The teaching button may be a mechanical button or touch-electric button. Further, another button having a different function may be placed around the teaching button.

Next, the control apparatus 8 will be explained.

As shown in FIG. 1, the control apparatus 8 is provided inside of the base 21 in the embodiment. Further, as shown in FIG. 2, the control apparatus 8 has a function of controlling driving of the robot 2 and is electrically coupled to the above described respective parts of the robot 2. The control apparatus 8 includes a CPU (Central Processing Unit) 81, a storage unit 82, and a communication unit 83. These respective units are coupled communicably with one another via e.g. a bus.

The CPU 81 reads and executes various programs etc. stored in the storage unit 82. A command signal generated in the CPU 81 is transmitted to the respective parts of the robot 2 via the communication unit 83. Thereby, the robot arm 20 may execute a predetermined work.

The storage unit 82 stores various programs etc. that can be executed by the CPU 81. The storage unit 82 includes e.g. a volatile memory such as a RAM (Random Access Memory), nonvolatile memory such as a ROM (Read Only Memory), and detachable external storage device.

The communication unit 83 respectively transmits and receives signals between the respective parts of the robot 2 and the teaching apparatus 3 using an external interface such as e.g. a wired LAN (Local Area Network) or wireless LAN.

Next, the teaching apparatus 3 will be explained.

As shown in FIG. 2, the teaching apparatus 3 has a function of designating a motion program for the robot 2. Specifically, the teaching apparatus 3 inputs the position and the posture of the robot arm 20 to the control apparatus 8.

As shown in FIG. 2, the teaching apparatus 3 has a CPU (Central Processing Unit) 31, a storage unit 32, a communication unit 33, and the display unit 34. The teaching apparatus 3 is not particularly limited to, but includes e.g. a tablet, personal computer, and smartphone.

The CPU 31 reads and executes various programs etc. stored in the storage unit 32. The signal generated in the CPU 31 is transmitted to the control apparatus 8 of the robot 2 via the communication unit 33. Thereby, the robot arm 20 may execute a predetermined work under a predetermined condition.

The storage unit 32 stores various programs etc. that can be executed by the CPU 31. The storage unit 32 includes e.g. a volatile memory such as a RAM (Random Access Memory), nonvolatile memory such as a ROM (Read Only Memory), and detachable external storage device.

The communication unit 33 transmits and receives signals between the control apparatus 8 and itself using an external interface such as e.g. a wired LAN (Local Area Network) or wireless LAN.

The display unit 34 includes various displays. In the embodiment, as an example, the display unit 34 having a touch panel configuration, i.e., a configuration having a display function and an input operation function is explained.

Note that the display unit is not limited to the configuration, but an input operation unit may be separately provided. In this case, the input operation unit includes e.g. a mouse and keyboard. Or, a configuration using both a touch panel and a mouse and keyboard may be employed.

Here, in the present disclosure, the following operations are performed when the robot arm 20 contacts the object, and thereby, safety may be increased. As below, this will be explained. Note that, as below, as shown in FIGS. 3 to 6, a case where a human arm 400 is caught between the lower end portion of the shaft 241 and a working surface 300 will be explained as an example. In FIGS. 3 to 6, the end effector 7 is not shown.

Figure 3:
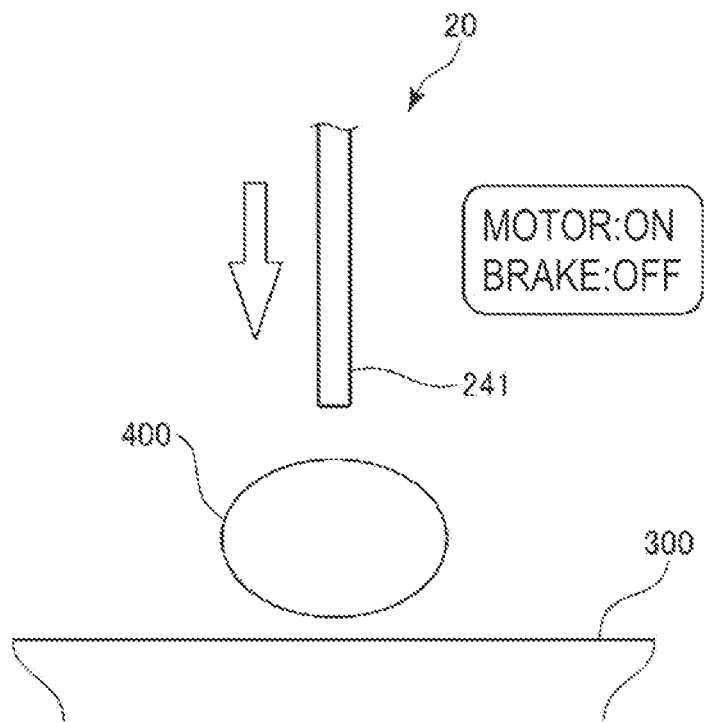
FIG. 3 is a side view of a third arm provided in a robot shown in FIG. 1.

As shown in FIG. 3, an assumption that the arm 400 enters below the shaft 241 and the shaft 241 starts to fall during driving of the robot arm 20 is made. In the state shown in FIG. 3, the motor 251, the motor 261, the motor 271, and the motor 281 are actuated in the ON-state. Further, the brake 252, the brake 262, the brake 272, and the brake 282 are not actuated in the OFF-state.

Figure 4:
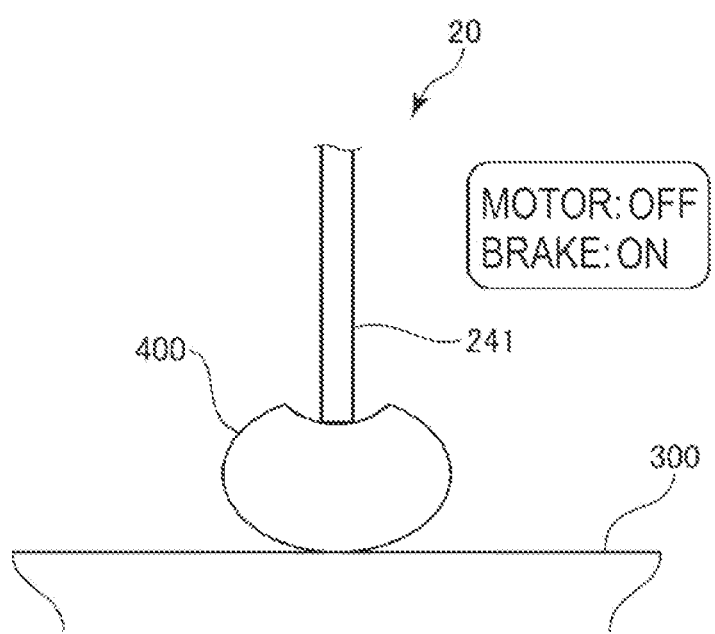
FIG. 4 is a side view of the third arm provided in the robot shown in FIG. 1.

Then, as shown in FIG. 4, the shaft 241 may further fall and the arm 400 may be caught between the working surface 300 and the shaft 241. When the contact between the robot arm 20 and the arm 400 is detected, the actuation of the motor 251, the motor 261, the motor 271, and the motor 281 is stopped into the OFF-state. Concurrently, the brake 252, the brake 262, the brake 272, and the brake 282 are actuated into the ON-state to decelerate, preferably, stop the robot arm 20. Thereby, application of more load to the arm 400 may be prevented or suppressed. Note that, in the state shown in FIG. 4, the arm 400 is pressed by the shaft 241 and depressed.

In the embodiment, whether or not an object, i.e., the arm 400 contacts the robot arm 20 during driving of the robot arm 20 is determined based on the detection result of the force detection unit 5.

Note that the determination as to whether or not an object, i.e., the arm 400 contacts the robot arm 20 during driving of the robot arm 20 is not limited to that described above. For example, the determination may be made based on whether or not an emergency stop button (not shown) is pressed.

Figure 5:
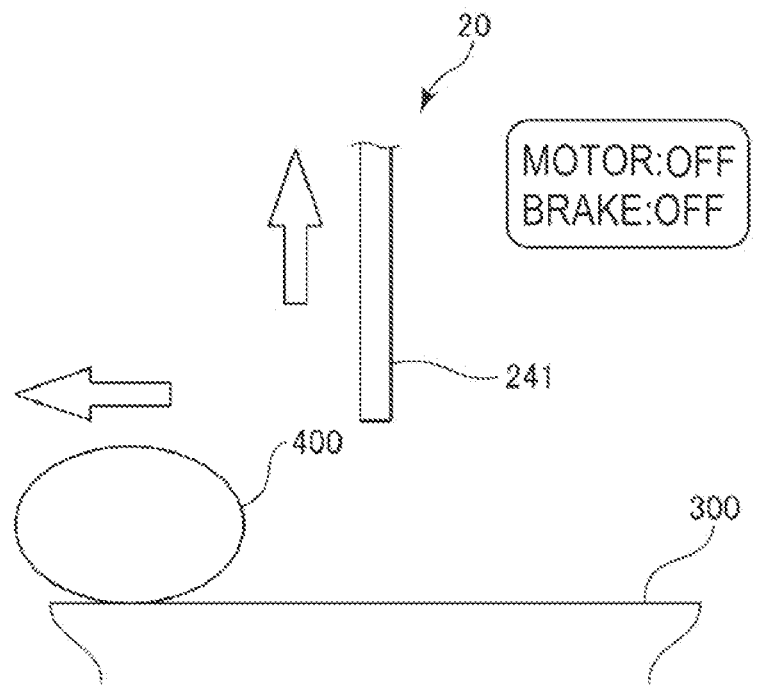
FIG. 5 is a side view of the third arm provided in the robot shown in FIG. 1.

Then, as shown in FIG. 5, with the actuation of the motor 251, the motor 261, the motor 271, and the motor 281 in the OFF-state, the actuation of the brake 252, the brake 262, the brake 272, and the brake 282 is released into the OFF-state. Thereby, the robot arm 20 is movable by application of an external force. Accordingly, the load on the arm 400 is reduced and the shaft 241 is pushed back upward by resilience of the arm 400.

Note that turning the brake 252, the brake 262, the brake 272, and the brake 282 into the OFF-state includes relaxing the actuation of the brake 252, the brake 262, the brake 272, and the brake 282.

The brake 252, the brake 262, the brake 272, and the brake 282 are turned into the OFF-state when one of the following conditions is satisfied.

Condition A1: after deceleration of the robot arm 20, the velocity of the robot arm 20 becomes equal to or less than a predetermined value VA.

Condition A2: after deceleration of the robot arm 20, the contact state between the robot arm 20 and the arm 400 becomes stable.

Condition A3: after deceleration of the robot arm 20, time TA elapses.

The velocity of the robot arm 20 in the condition A1 refers to the velocity of the control point TCP or the velocities of the respective joints. These may be calculated from the position information detected by the encoder 253, the encoder 263, the encoder 273, and the encoder 283 in the embodiment. The predetermined value VA refers to a value at which the robot arm 20 may be regarded as being stopped. The predetermined value VA is a preset value and stored in the storage unit 82. After deceleration of the robot 20, the CPU 81 calculates the velocity of the control point TCP in the movement direction or the velocities of the respective joints in the movement directions and, when the calculated velocity becomes equal to or less than the predetermined value VA, determines that the condition A1 is satisfied.

As described above, the velocity of the robot arm 20 in the condition A1 refers to the velocity of the control point TCP of the robot arm 20 or the velocities of the joints of the robot arm 20. Thereby, the actuation of the brake 252, the brake 262, the brake 272, and the brake 282 may be released or relaxed at a proper time. Therefore, the safety may be increased.

"The contact state between the robot arm 20 and the arm 400 becomes stable" in the condition A2 refers to a state in which the amount of change of the magnitude of the external force applied to the robot arm 20 detected by the force detection unit 5 becomes equal to or less than a predetermined value FA in the embodiment. The CPU 81 calculates the magnitude and the amount of change of the external force applied to the robot arm 20 and, when the value of the amount of change becomes equal to or less than the predetermined value FA, determines that the condition A2 is satisfied. The predetermined value FA refers to a value at which the robot arm 20 may be regarded as being stopped. The predetermined value FA is a preset value and stored in the storage unit 82.

As described above, the contact state in the condition A2 is determined based on the detection result of the force detection unit 5. Thereby, the actuation of the brake 252, the brake 262, the brake 272, and the brake 282 may be released or relaxed at a proper time. Therefore, the safety may be increased.

The time TA in the condition A3 is a value stored in the storage unit 82 in advance. The time is measured after the deceleration of the robot arm 20 using a timer (not shown) of the control apparatus 8 and, when the time becomes the time TA, the CPU 81 determines that the condition A3 is satisfied. Note that the time TA is a sufficient time after the brake 252, the brake 262, the brake 272, and the brake 282 are actuated and before the robot 20 stops, e.g. from about one second to three seconds. The time TA is a preset value and stored in the storage unit 82.

As described above, whether or not one of the condition A1 to condition A3 is satisfied is determined, and thereby, the actuation of the brake 252, the brake 262, the brake 272, and the brake 282 may be released or relaxed at a proper time. Therefore, as shown in FIG. 5, the load on the arm 40 may be reduced and the arm may be restored into a state with little load. Further, the load on the arm 400 may be reduced by lifting of the shaft 241.

Figure 6:
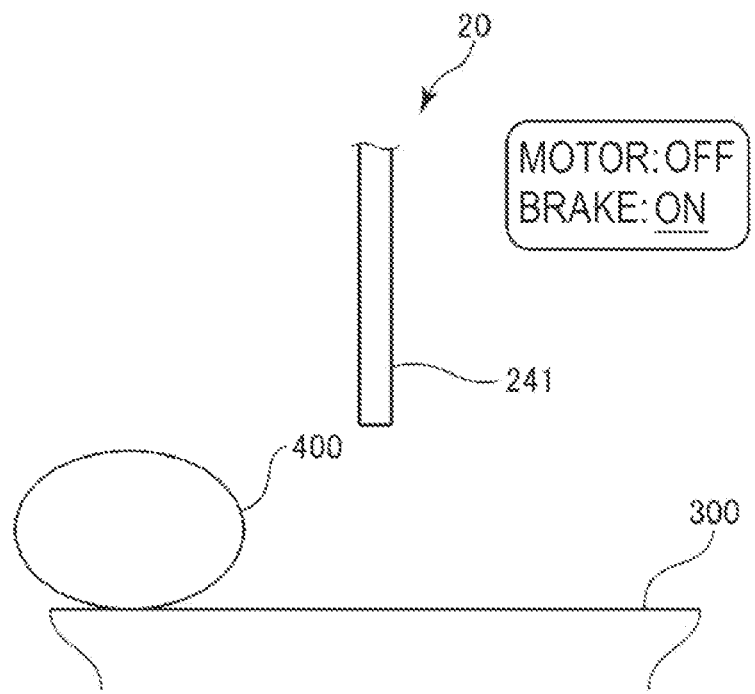
FIG. 6 is a side view of the third arm provided in the robot shown in FIG. 1.
Figure 7:
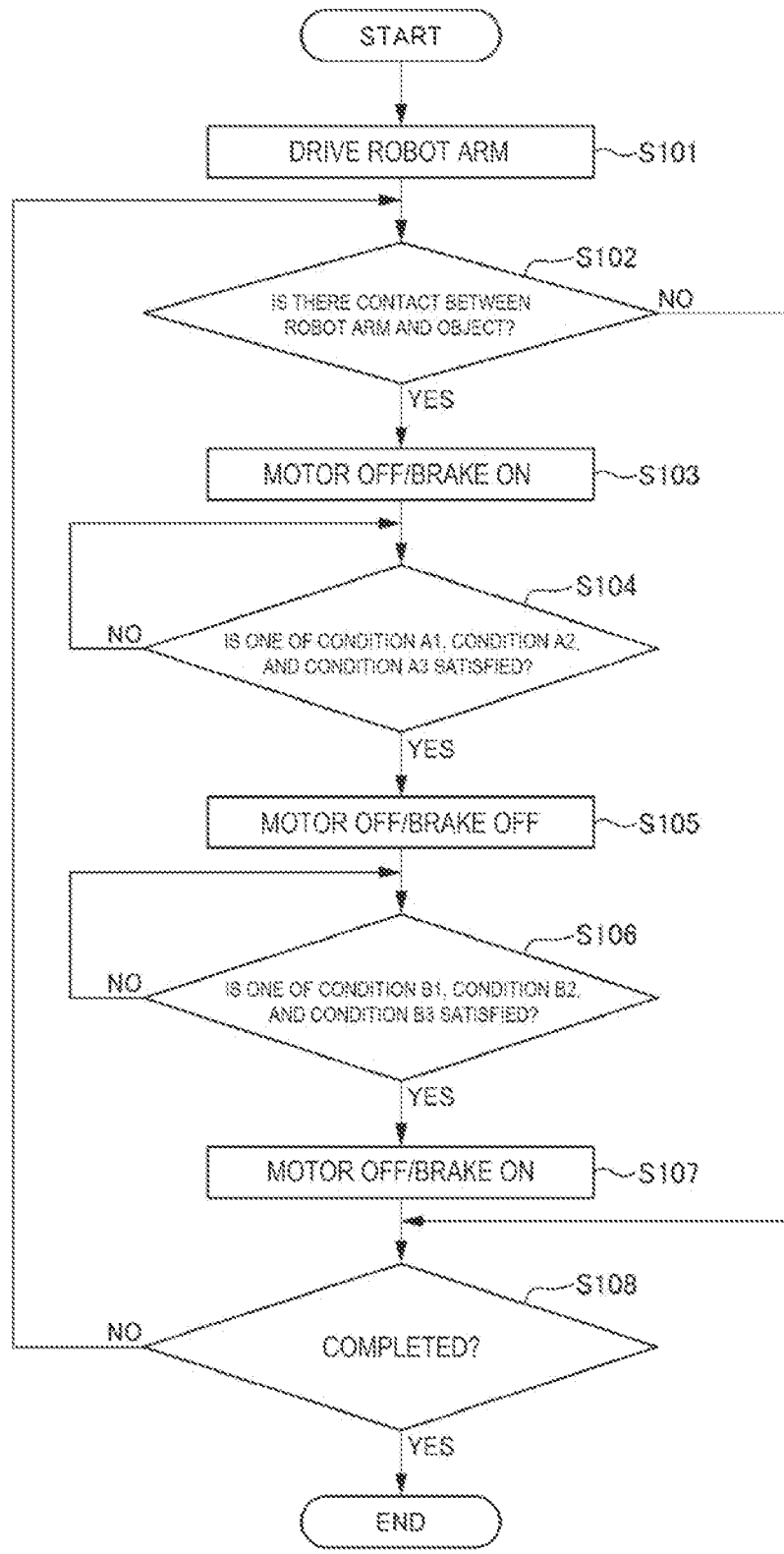
FIG. 7 is a flowchart for explanation of a control method according to the present disclosure.

Then, as shown in FIG. 6, the brake 252, the brake 262, the brake 272, and the brake 282 are actuated again, i.e., into the ON-state again.

The brake 252, the brake 262, the brake 272, and the brake 282 are turned into the ON-state again when one of the following condition B1 to condition B3 is satisfied.

Condition B1: after release or relaxation of the brake 252, the brake 262, the brake 272, and the brake 282, time TB elapses.

Condition B2: after release or relaxation of the brake 252, the brake 262, the brake 272, and the brake 282, the movement amount of the robot arm 20 becomes equal to or more than a predetermined value EB.

Condition B3: after release or relaxation of the brake 252, the brake 262, the brake 272, and the brake 282, the contact state between the arm 400 and the robot arm 20 is released or relaxed.

The time TB in the condition B1 is a sufficient value at which the shape of the arm 400 can be restored and the arm 400 can be drawn away, e.g. from about one second to five seconds. The time TB is a predetermined value and stored in the storage unit 82. The time after the brake 252, the brake 262, the brake 272, and the brake 282 are turned OFF is measured using a timer (not shown) of the control apparatus 8 and, when the time reaches the time TB, the CPU 81 determines that the condition B1 is satisfied.

The movement amount in the condition B2 refers to the amount of movement of the control point TCP calculated based on the encoder 253, the encoder 263, the encoder 273, and the encoder 283. When the movement amount becomes equal to or more than the predetermined value EB, the CPU 81 determines that the condition B2 is satisfied. Note that the predetermined value EB is a sufficient value at which the shape of the arm 400 can be restored and the arm 400 can be drawn away. The predetermined value EB is a preset value and stored in the storage unit 82.

As described above, the robot 2 has the encoder 253, encoder 263, the encoder 273, and the encoder 283 as the position detectors that detect the position of the robot arm 20. Further, the movement amount in the condition B2 is calculated based on the detection results of the encoder 253, the encoder 263, the encoder 273, and the encoder 283. Thereby, the brake 252, the brake 262, the brake 272, and the brake 282 may be actuated again at a proper time to restrict driving of the robot arm 20.

"The contact state between the robot arm 20 and the arm 400 is released or relaxed" in the condition B3 refers to a state in which the magnitude of the external force applied to the robot arm 20, i.e., the contact force detected by the force detection unit 5 becomes equal to or less than the predetermined value FB in the embodiment. The CPU 81 calculates the magnitude of the external force applied to the robot arm 20 and, when the value becomes equal to or less than the predetermined value FB, determines that the condition B3 is satisfied. That is, the predetermined value FB is a sufficient value at which the shape of the arm 400 can be restored and the arm 400 can be drawn away. The predetermined value FB is a preset value and stored in the storage unit 82.

As described above, the contact state in the condition B3 is determined based on the detection result of the force detection unit 5. Thereby, the brake 252, the brake 262, the brake 272, and the brake 282 may be actuated again at a proper time to restrict driving of the robot arm 20.

In the above described manner, whether or not one of the condition B1 to condition B3 is satisfied is determined, and thereby, the brake 252, the brake 262, the brake 272, and the brake 282 may be actuated again at a proper time to restrict driving of the robot arm 20. Therefore, as shown in FIG. 6, the motion of the robot arm 20 may be restricted and unintended motion of the robot arm 20 may be prevented or suppressed. As a result, the safety may be further increased.

Here, in related art, the OFF-state of the brakes is maintained after the arm 400 is drawn away and the robot arm may unintendedly move. Specifically, a human may excessively push aside the robot arm or the robot arm may drop under its own weight, and the safety is not secured. On the other hand, in the present disclosure, as shown in FIG. 6, the brake 252, the brake 262, the brake 272, and the brake 282 may be turned ON again at a proper time, and thereby, unintended movement of the robot arm 20 may be prevented. Therefore, the safety may be increased.

As described above, the robot system 100 according to the present disclosure includes the robot arm 20, the motor 251, the motor 261, the motor 271, and the motor 281 as drive units that drive the robot arm 20, the brake 252, the brake 262, the brake 272, and the brake 282 that decelerate the robot arm 20, and the control apparatus 8 as a control unit that controls the actuation of the motor 251, the motor 261, the motor 271, the motor 281, the brake 252, the brake 262, the brake 272, and the brake 282. Further, when determining that an object contacts the robot arm 20 during driving, the control apparatus 8 actuates the brake 252, the brake 262, the brake 272, and the brake 282 to decelerate the robot arm 20, when one of the following condition A1, the following condition A2, and the following condition A3 is satisfied after deceleration of the robot arm 20, releases or relaxes the actuation of the brake 252, the brake 262, the brake 272, and the brake 282, and, when one of the following condition B1, the following condition B2, and the following condition B3 is satisfied after release or relaxation of the brake 252, actuates the brake 262, the brake 272, and the brake 282, the brake 252, the brake 262, the brake 272, and the brake 282 again to restrict driving of robot arm 20.

Condition A1: after deceleration of the robot arm 20, the velocity of the robot arm 20 becomes equal to or less than the predetermined value VA.

Condition A2: after deceleration of the robot arm 20, the contact state between the robot arm 20 and the object becomes stable.

Condition A3: after deceleration of the robot arm 20, time TA elapses.

Condition B1: after release or relaxation of the brake 252, the brake 262, the brake 272, and the brake 282, time TB elapses.

Condition B2: after release or relaxation of the brake 252, the brake 262, the brake 272, and the brake 282, the movement amount of the robot arm 20 becomes equal to or more than the predetermined value EB.

Condition B3: after release or relaxation of the brake 252, the brake 262, the brake 272, and the brake 282, the contact state between the object and the robot arm 20 is released or relaxed.

According to the present disclosure, unintended motion of the robot arm 20 after the robot arm 20 contacts the object and the object is drawn away may be prevented or suppressed. Therefore, the safety may be increased. Further, the actuation of the brake 252, the brake 262, the brake 272, and the brake 282 may be released or relaxed at a proper time after deceleration of the robot arm 20. Furthermore, the brake 252, the brake 262, the brake 272, and the brake 282 may be actuated again to restrict driving of the robot arm 20 at a proper time after release or relaxation of the brake 252, the brake 262, the brake 272, and the brake 282.

As described above, according to the present disclosure, the safety may be increased.

Next, an example of the control method according to the present disclosure, i.e., the control operation performed by the CPU 81 will be explained according to the flowchart shown in FIG. 7. Note that the following steps may be shared by the CPU 81 and the CPU 31. Further, as below, as is the case described above, the case where the object contacting the robot arm 20 is the human arm 400 will be explained.

First, at step S101, the robot arm 20 is driven. That is, the motion program designated by the teaching apparatus 3 is executed.

Then, at step S102, whether or not the robot arm 20 the arm 400 contact is determined. The determination is made based on the detection result of the force detection unit 5. More specifically, the magnitude of the external force applied to the robot arm 20 is calculated based on the detection result of the force detection unit 5 and, when the magnitude of the external force becomes equal to or more than a predetermined value, the contact between the robot arm 20 and the arm 400 is determined.

At step S102, when the contact between the robot arm 20 and the arm 400 is determined, the process moves to step S103. Or, at step S102, when the contact between the robot arm 20 and the arm 400 is not determined, the process moves to step S108, which will be described later.

At step S103, the actuation of the motor 251, the motor 261, the motor 271, and the motor 281 is stopped, i.e., into the OFF-state and the brake 252, the brake 262, the brake 272, and the brake 282 are actuated, i.e., into the ON-state. Thereby, application of more load to the arm 400 from the robot arm 20 may be prevented or suppressed.

The step S103 is a first step of decelerating the robot arm 20 by actuating the brake 252, the brake 262, the brake 272, and the brake 282 when the contact of the object with the robot arm 20 during driving of the robot arm 20 is determined.

Then, at step S104-1, whether or not the condition A1 is satisfied is determined. When a satisfaction of the condition A1 is determined, the process moves to step S105. On the other hand, when the satisfaction of the condition A1 is not determined, at step S104-2, whether or not the condition A2 is satisfied is determined. When a satisfaction of the condition A2 is determined, the process moves to step S105. On the other hand, when the satisfaction of the condition A2 is not determined, at step S104-3, whether or not the condition A3 is satisfied is determined. When a satisfaction of the condition A3 is determined, the process moves to step S105. On the other hand, when the satisfaction of the condition A3 is not determined, the process returns to step S104-1.

That is, at step A104-1, step A104-2, and step A104-3, when the satisfaction of one of the condition A1, the condition A2, and the condition A3 is determined, the process moves to step S105.

Note that "the satisfaction is not determined" includes a case where the conditions are judged and not satisfied and a case where the judgement is not performed in the first place. This applies to step S106-1, step S106-2, and step S106-3, which will be described later.

At step S105, with the actuation of the motor 251, the motor 261, the motor 271, and the motor 281 stopped, i.e., in the OFF-state, the actuation of the brake 252, the brake 262, the brake 272, and the brake 282 is released or relaxed, i.e., in the OFF-state. Thereby, for example, the arm 400 may be drawn away by lifting of the robot arm 20.

The step S105 is a second step of releasing or relaxing the actuation of the brake 252, the brake 262, the brake 272, and the brake 282 when one of the condition A1, the condition A2, and the condition A3 is satisfied after deceleration of the robot arm 20.

Then, at step S106-1, whether or not the condition B1 is satisfied is determined. When a satisfaction of the condition B1 is determined, the process moves to step S107. On the other hand, when the satisfaction of the condition B1 is not determined, at step S106-2, whether or not the condition B2 is satisfied is determined. When a satisfaction of the condition B2 is determined, the process moves to step S107. On the other hand, when the satisfaction of the condition B2 is not determined, at step S106-3, whether or not the condition B3 is satisfied is determined. When a satisfaction of the condition B3 is determined, the process moves to step S107. On the other hand, when the satisfaction of the condition B3 is not determined, the process returns to step S106-1.

That is, at step B106-1, step B106-2, and step B106-3, when the satisfaction of one of the condition B1, the condition B2, and the condition B3 is determined, the process moves to step S107.

At step S107, with the actuation of the motor 251, the motor 261, the motor 271, and the motor 281 stopped, i.e., in the OFF-state, the brake 252, the brake 262, the brake 272, and the brake 282 are actuated again into the ON-state to restrict driving of the robot arm 20. Thereby, unintended motion of the robot arm 20 after the arm 400 is drawn away after the contact between the robot arm 20 and the arm 400 may be prevented or suppressed. Therefore, the safety may be increased.

The step S107 is a third step of actuating the brake 252, the brake 262, the brake 272, and the brake 282 again to restrict driving of the robot arm 20 when one of the condition B1, the condition B2, and the condition B3 is satisfied after release or relaxation of the brake 252, the brake 262, the brake 272, and the brake 282.

Then, at step S108, whether or not the motion program is completed is determined. At step S108, when completion is not determined, the process returns to step S102 and the subsequent steps are sequentially repeated.

As described above, the control method according to the present disclosure is the control method for the robot 2 having the robot arm 20, the motor 251, the motor 261, the motor 271, and the motor 281 as drive units that drive the robot arm 20, and the brake 252, the brake 262, the brake 272, and the brake 282 that decelerate the robot arm 20. Further, the control method according to the present disclosure executes the first step of actuating the brake 252, the brake 262, the brake 272, and the brake 282 to decelerate the robot arm 20 when contact of an object with the robot arm 20 during driving is determined, the second step of releasing or relaxing the actuation of the brake 252, the brake 262, the brake 272, and the brake 282 when one of the following condition A1, the following condition A2, and the following condition A3 is satisfied after the first step, and the third step of actuating the brake 252, the brake 262, the brake 272, and the brake 282 again to restrict driving of the robot arm 20 when one of the following condition B1, the following condition B2, and the following condition B3 is satisfied after the second step.

Condition A1: after deceleration of the robot arm 20, the velocity of the robot arm 20 becomes equal to or less than the predetermined value.

Condition A2: after deceleration of the robot arm 20, the contact state between the robot arm 20 and the object becomes stable.

Condition A3: after deceleration of the robot arm 20, time TA elapses.

Condition B1: after release or relaxation of the brake 252, the brake 262, the brake 272, and the brake 282, time TB elapses.

Condition B2: after release or relaxation of the brake 252, the brake 262, the brake 272, and the brake 282, the movement amount of the robot arm 20 becomes equal to or more than the predetermined value.

Condition B3: after release or relaxation of the brake 252, the brake 262, the brake 272, and the brake 282, the contact state between the object and the robot arm 20 is released or relaxed.

According to the present disclosure, unintended motion of the robot arm 20 after the robot arm 20 contacts the object and the object is drawn away may be prevented or suppressed. Therefore, the safety may be increased. Further, the actuation of the brake 252, the brake 262, the brake 272, and the brake 282 may be released or relaxed at a proper time after deceleration of the robot arm 20. Furthermore, the brake 252, the brake 262, the brake 272, and the brake 282 may be actuated again to restrict driving of the robot arm 20 at a proper time after release or relaxation of the brake 252, the brake 262, the brake 272, and the brake 282.

As described above, according to the present disclosure, the safety may be increased.

At step S103 as the first step, at step S105 as the second step, and, at step S107 as the third step, the motor 251, the motor 261, the motor 271, and the motor 281 are not driven. Thereby, the safety may be further increased. The above described safety may be secured even when the actuation of the brake 252, the brake 262, the brake 272, and the brake 282 is made lower, and that contributes to lower power consumption.

The robot arm 20 has the first arm 22 rotating about the first axis O1, the second arm 23 coupled to the first arm 22 and rotating about the second axis O2 parallel to the first axis O1, and the third arm 24 coupled to the second arm, rotating about the third axis O3 parallel to the first axis O1, and moving along the third axis O3. Further, the first step, the second step, and the third step are respectively executed for the first arm 22, the second arm 23, and the third arm 24. Thereby, the safety may be further increased. Particularly, the third step is performed for all of the first arm 22, the second arm 23, and the third arm 24, and thereby, the position and posture of the robot arm 20 may be maintained as far as possible and the work may be smoothly restarted.

Note that, in the embodiment, ON and OFF are switched at the same time with respect to all of the motor 251, the motor 261, the motor 271, and the motor 281 at the above described steps, however, the present disclosure is not limited to that. The motor 251, the motor 261, the motor 271, and the motor 281 may be switched at different times.

Further, the above described respective steps may be performed with respect to not all of the motor 251, the motor 261, the motor 271, and the motor 281, but only at least one of the motors e.g. the motor near the portion in contact with the object of the robot arm 20.

In the embodiment, ON and OFF are switched at the same time with respect to all of the brake 252, the brake 262, the brake 272, and the brake 282, however, the present disclosure is not limited to that. The brake 252, the brake 262, the brake 272, and the brake 282 may be switched at different times.

Further, the above described respective steps may be performed with respect to not all of the brake 252, the brake 262, the brake 272, and the brake 282, but only at least one of the brakes e.g. the brake near the portion in contact with the object of the robot arm 20.

In the embodiment, the brake 252, the brake 262, the brake 272, and the brake 282 as the excitation-operated brakes are explained, however, the brakes may be non-excitation-operated brakes.

Note that "after deceleration of the robot arm 20" may refer to "after the robot arm 20 starts to decelerate" or "after the robot arm 20 completes deceleration".

As above, the control method and the robot system according to the present disclosure are explained based on the illustrated embodiments, however, the present disclosure is not limited to those. The configurations of the respective parts may be replaced by arbitrary configurations having the same functions. Further, other arbitrary configurations and steps may be respectively added to the control method and the robot system according to the present disclosure.

What is claimed is:

1. A control method for a robot having a robot arm, a drive unit that drives the robot arm, and a brake that decelerates the robot arm, comprising:
    a first step of actuating the brake to decelerate the robot arm when contact of an object with the robot arm during driving is determined;
    a second step of releasing or relaxing the actuation of the brake when one of the following condition A1, the following condition A2, and the following condition A3 is satisfied after the first step; and
    a third step of actuating the brake again to restrict driving of the robot arm when one of the following condition B1, the following condition B2, and the following condition B3 is satisfied after the second step:
    condition A1: after deceleration of the robot arm, a velocity of the robot arm becomes equal to or less than a predetermined value;
    condition A2: after deceleration of the robot arm, a contact state between the robot arm and the object becomes stable;
    condition A3: after deceleration of the robot arm, time TA elapses;
    condition B1: after release or relaxation of the brake, time TB elapses;
    condition B2: after release or relaxation of the brake, a movement amount of the robot arm becomes equal to or more than a predetermined value; and
    condition B3: after release or relaxation of the brake, the contact state between the object and the robot arm is released or relaxed.

2. The control method according to claim 1, wherein the velocity of the robot arm in the condition A1 is a velocity of a control point of the robot arm or a velocity of a joint of the robot arm.

3. The control method according to claim 1, wherein the robot has a force detection unit that detects a force applied to the robot arm.

4. The control method according to claim 3, wherein the contact state in the condition A2 is determined based on a detection result of the force detection unit.

5. The control method according to claim 3, wherein the contact state in the condition B3 is determined based on a detection result of the force detection unit.

6. The control method according to claim 1, wherein the robot has a position detector that detects a position of the robot arm, and
the movement amount in the condition B2 is calculated based on a detection result of the position detector.

7. The control method according to claim 1, wherein the drive unit is not driven at the first step, the second step, and the third step.

8. The control method according to claim 1, wherein the robot arm has a first arm rotating about a first axis, a second arm coupled to the first arm and rotating about a second axis parallel to the first axis, and a third arm coupled to the second arm, rotating about a third axis parallel to the first axis, and moving along the third axis, and
the first step, the second step, and the third step are respectively executed for the first arm, the second arm, and the third arm.

9. A robot system comprising:
a robot arm;
a drive unit that drives the robot arm;
a brake that decelerates the robot arm; and
a control unit that controls actuation of the drive unit and the brake, wherein
the control unit actuates the brake to decelerate the robot arm when determining that an object contacts the robot arm during driving,
releases or relaxes actuation of the brake when one of the following condition A1, the following condition A2, and the following condition A3 is satisfied after deceleration of the robot arm, and
actuates the brake again to restrict driving of the robot arm when one of the following condition B1, the following condition B2, and the following condition B3 is satisfied after release or relaxation of the brake:
condition A1: after deceleration of the robot arm, a velocity of the robot arm becomes equal to or less than a predetermined value;
condition A2: after deceleration of the robot arm, a contact state between the robot arm and the object becomes stable;
condition A3: after deceleration of the robot arm, time TA elapses;
condition B1: after release or relaxation of the brake, time TB elapses;
condition B2: after release or relaxation of the brake, a movement amount of the robot arm becomes equal to or more than a predetermined value; and
condition B3: after release or relaxation of the brake, the contact state between the object and the robot arm is released or relaxed.

* * * * *